US010755255B2

(12) United States Patent
Edwards

(10) Patent No.: US 10,755,255 B2
(45) Date of Patent: *Aug. 25, 2020

(54) STANDARDIZING POINT OF SALE SERVICES AND LEVERAGING INSTANCES OF THE PLU DATA

(71) Applicant: NCR Corporation, Duluth, GA (US)

(72) Inventor: Thomas V. Edwards, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/693,645

(22) Filed: Sep. 1, 2017

(65) Prior Publication Data

US 2018/0025337 A1   Jan. 25, 2018

Related U.S. Application Data

(63) Continuation of application No. 13/250,741, filed on Sep. 30, 2011, now Pat. No. 9,754,247.

(51) Int. Cl.
*G06Q 20/20* (2012.01)
*G06Q 30/00* (2012.01)

(52) U.S. Cl.
CPC .............. *G06Q 20/20* (2013.01); *G06Q 30/00* (2013.01)

(58) Field of Classification Search
CPC ....................................... G06Q 20/20
USPC ............................................... 705/16
See application file for complete search history.

(56) References Cited

U.S. PATENT DOCUMENTS 9,754,247 B2 *  9/2017  Edwards ................ G06Q 30/00
2014/0089113 A1 *  3/2014  Desai .................. G06Q 20/322
                                                    705/16

* cited by examiner

*Primary Examiner* — Russell S Glass
(74) *Attorney, Agent, or Firm* — Schwegman, Lundberg & Woessner

(57) ABSTRACT

An adaptable and extensible interface is described for connecting one or more point of sale (POS) applications to one or more at a wide variety of retail application is described. The interface may be embodied as a programmable state machine employing XML files to customize its operation reusable retail applications may be utilized as part of the interface approach.

17 Claims, 4 Drawing Sheets

STANDARDIZING POINT OF SALE SERVICES AND LEVERAGING INSTANCES OF THE PLU DATA

CROSS REFERENCE TO RELATED APPLICATION

This application claims the benefit of U.S. Provisional Patent Application Ser. No. 61/420,064 entitled "Methods and Apparatus for Standardizing Point of Sale Services" filed Dec. 6, 2010 which is hereby incorporated by reference in its entirety.

U.S. applicant Ser. No. 13/250,392 filed on Sep. 30, 2011 is a related application and incorporated by reference herein in its entirety.

FIELD OF THE INVENTION

The present invention relates generally to improved techniques for interfacing point of sales (POS) terminals and their software applications with a wide variety of retail applications, and more particularly, to approaches for such interfaces which allow both POS terminals and their software applications and the retail applications to readily evolve, as well as, being readily adaptable to previously existing systems presenting a wide array of compatibility issues. One example is leveraging instances of the price look up (PLU) data to support in aisle scanning.

BACKGROUND OF THE INVENTION

Self-service applications, such as those supported by a self-service checkout terminal (SCO), commonly rely on the use of an instance of the POS application to supply the business logic such as item pricing, tax calculation, benefit programs and tenders. The POS application may either be local to the SCO terminal or a remote instance on a server. The implementation of the POS connection is often times complex and expensive.

Commonly, the SCO application exists as a separate application that presents the SCO user interface, device control, and the like. This SCO application is typically interfaced utilizing a POS wrapper through software such that the SCO application activities are communicated directly to the POS, for example, start a transaction, sell an item, tender a note, or the like.

Unfortunately, such an integration traditionally binds the POS and SCO applications such that upgrading either of them may be disruptive to the solution or require an expensive upgrade to the other.

It follows then that when new applications are introduced in the retail enterprise that the integration complexity must be repeated to produce a binding between the POS wrapper and the new application, propagating the fragile integration model yet further.

It is not uncommon to see standard interfaces to the POS such as National Retail Federation ARTS Retail Transaction Interface (RTI), or NCR TB Automation Interface (AI), and more; but these do not address decoupling the POS from the retail applications. Even direct POS interfaces, such as the RTI standard or an equivalent, do not fully address the issue because such POS interfaces are defined and implemented from the perspective of the POS application which may not be able to provide all the services required by the retail application, or the particular implementation of such an interface may still vary from POS application to retail application limiting widespread adoption or requiring widespread adoption as a standard to be practical. Such approaches also are predicated on the availability of such a specialized interface being defined and implemented for the POS application which may take a very long time to realize.

SUMMARY OF THE INVENTION

Aspects of the invention address systems and methods for separating the responsibility of the POS wrapper and the retail application interface so as to create a standardized extensible interface between the components that can be managed to provide all required services of multiple retail applications, and not specify the specific interface strategy to be used by the POS wrapper. This approach advantageously allows the POS and the associated wrapper to be freely advanced as long as the collective effect continues to meet the agreed interface requirements for the retail applications.

With the present invention, multiple retail applications may be provided with POS services through a standard interface, and each of the retail applications can provide its own service layer adapter as required. The POS may then be migrated and even its interface to the POS wrapper changed over time without disrupting the operation of any of the various retail applications that are adapted to the standard POS wrapper interface.

One example of the flexibility supported by the present invention is the leveraging of instances of the PLU data to support in aisle price checking and in aisle scanning.

A more complete understanding of the present invention, as well as further features and advantages of the invention, will be apparent from the following Detailed Description and the accompanying drawings.

DETAILED DESCRIPTION

Figure 1:
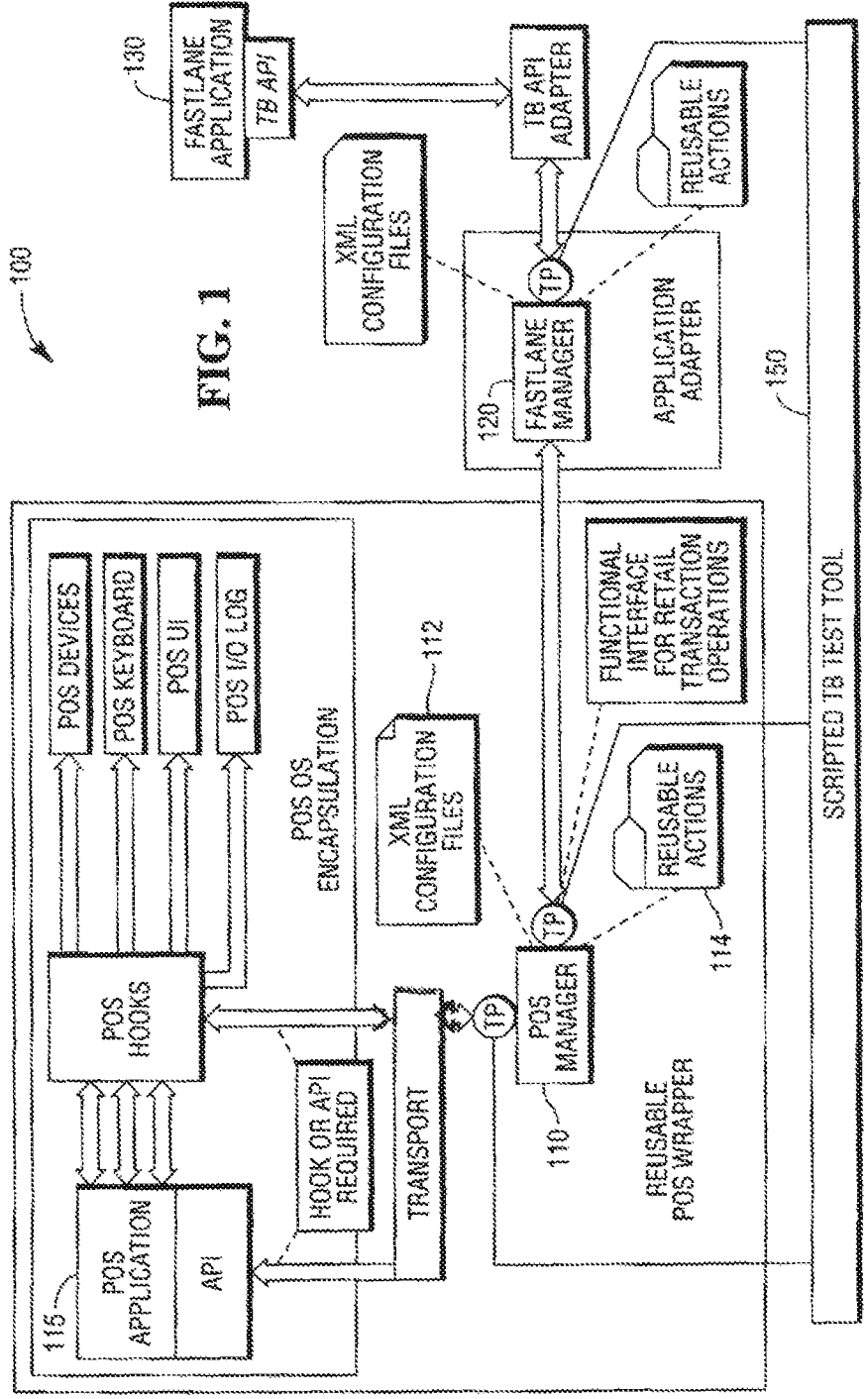
FIG. 1 shows a block diagram of a first embodiment of an interface in accordance with the present invention.
Figure 2:
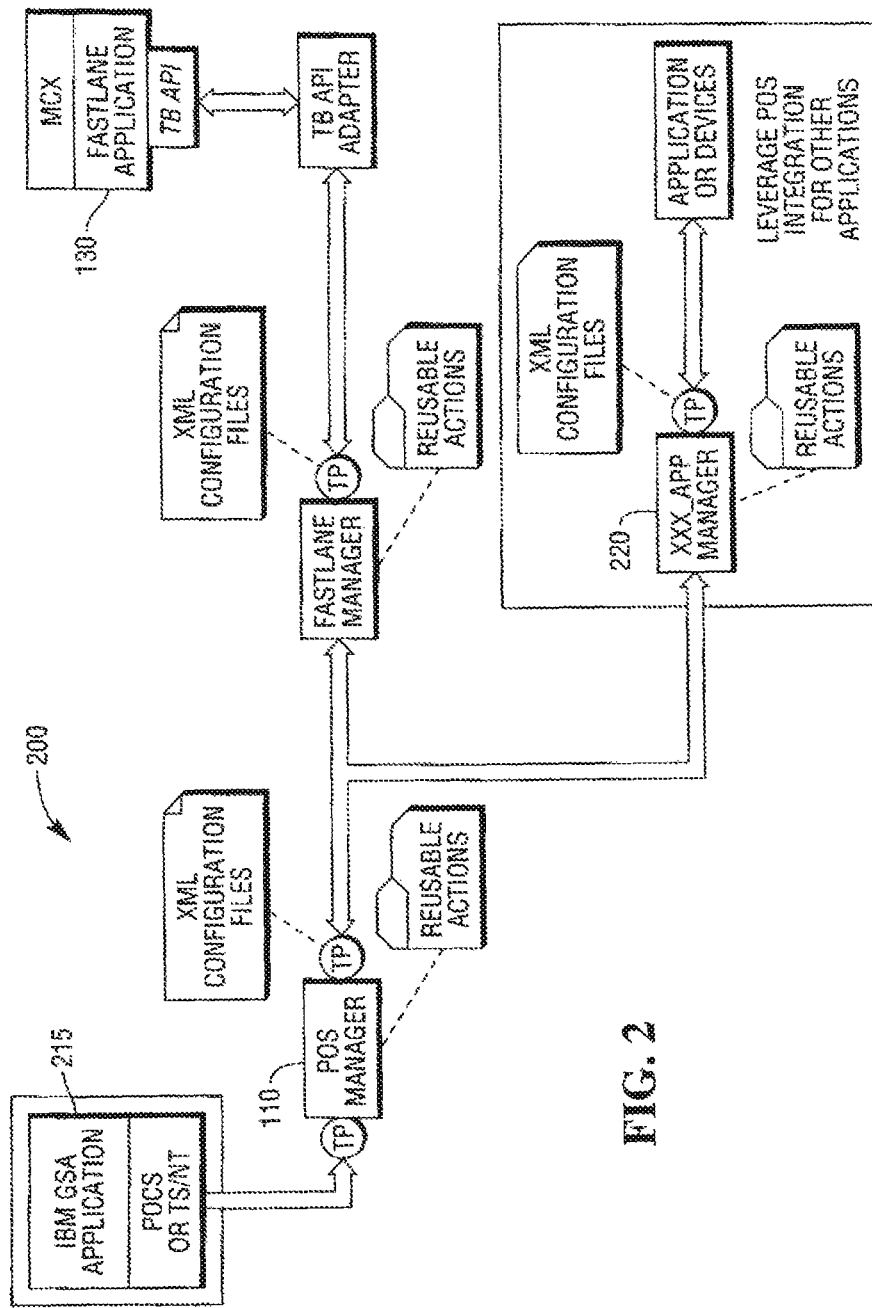
FIG. 2 illustrates the use of the interface of FIG. 1 to interface a different POS application.
Figure 3:
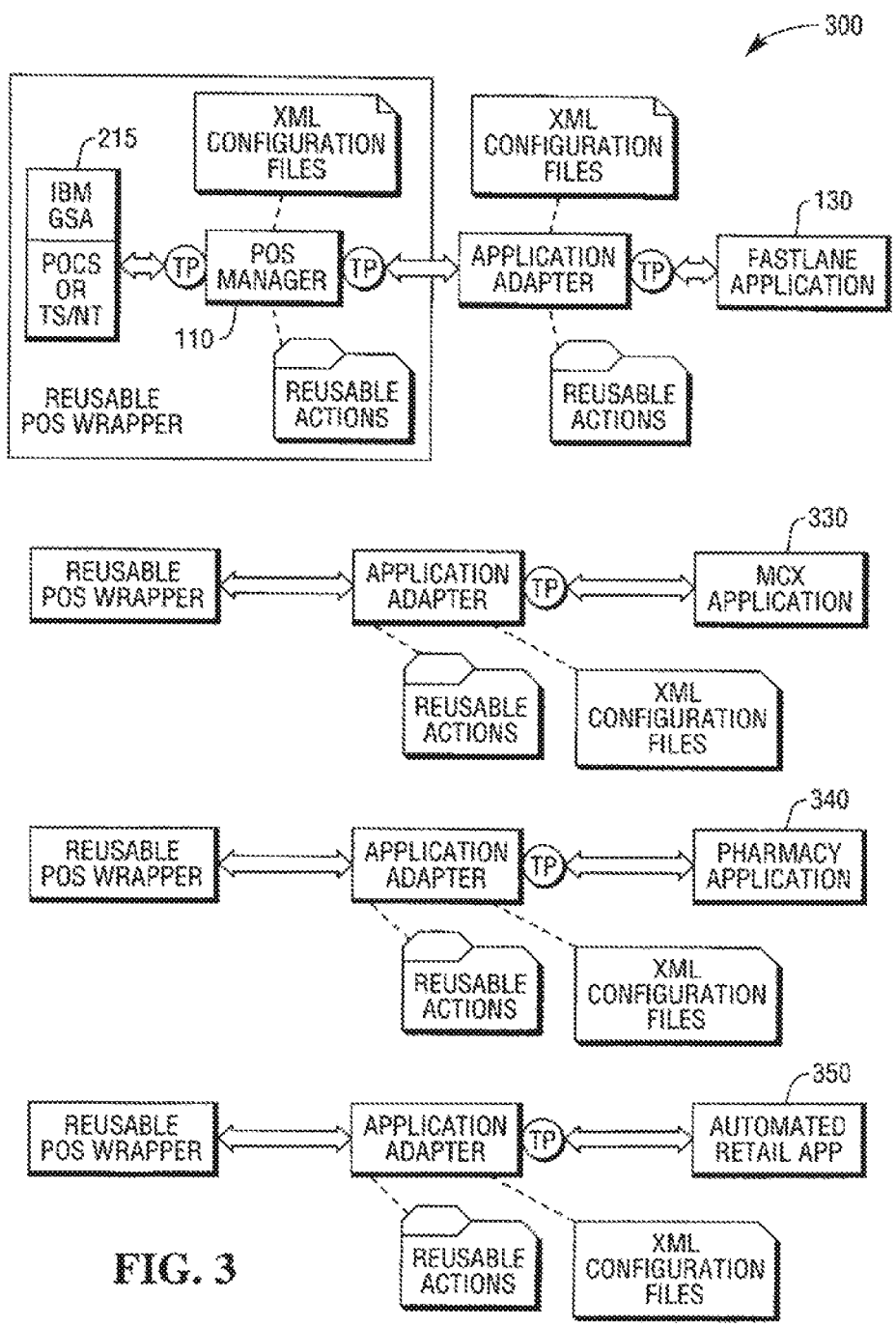
FIG. 3 illustrates an extension of the interface to multiple retail applications.

FIG. 1 shows one implementation of a system 100 in accordance with an embodiment of the present invention. A POS manager component 110 provides a standardized wrapper or interface for POS services 115. FastLane (FL) manager 120 provides an adapter from that standard interface to a single retail application, in this case the FastLane checkout application 130. In this case, the FL manager 120 is an adapter to a particular retail application. Scripted test engine 150 makes the interface readily testable to validate that application requirements are met. It will be recognized that the present invention is applicable to other retail applications, and other such adapters could be developed likewise as shown in FIGS. 2 and 3, for example.

In a presently preferred embodiment, the POS manager 110 is implemented as a programmable state machine which transitions from one state to another based upon the occurrence of a sequence of messages, events or inputs. XML configuration files 112 are preferably employed to describe the state machine states and scripts, and reusable actions 114 comprise a reusable inventory of operations in a domain such as the illustrated retail store environment.

As one example of the flexibility of the XML file approach, such files can be employed to establish a mapping between data and messages. For example, the FastLane application may send a sequence of data for a scanned bar code. Where the POS application does not directly recognize that data but does recognize keyboard keystrokes, the mapping provided by an XML file may translate the data to a message recognized by the POS application or convert it to a message, conveying the message "I am going to enter the bar code as a series of keystrokes" followed by a series of signals emulating the necessary keystrokes to represent the bar code data which are recognizable by the POS application. In a further example, the POS application accepts the item code but returns an error indicating that the item code is unknown to the POS application because it is not yet included in the inventory file. In this case, the wrapper working with the self-service application can instead provide in the sell item request to the POS application the department and price, and request that the same item code be sold as a general department sale. A wide variety of additional mappings or patterns may be suitably employed, such as a mapping for keys on a keyboard, or for parsing data from a printer or touch screen, the exchange of data from a magnetic stripe reader (MSR) track which might be passed to the POS channel to read such input or passed to the POS via a keyboard input channel allowing the keyed entry of card data, for example.

It will be recognized that peripherals, such as scanners, weigh scales, security scales, magnetic card stripe readers, displays, receipt printers, coin acceptors and dispensers, bill validators, cameras and the like which are all commonly found in POS and self-server environments, take a wide variety of forms and have various input and output signals as a result of their being manufactured by a large number of different manufacturers for differing end applications and contexts. It will further be recognized that auto repair centers, pharmacies and the like may employ retail applications which evolved separately from the evolution of POS applications, but that now large stores are more and more often combining a wider variety of such retail applications under one roof. Purchases may be made at a pharmacy, a flower shop, an oil and lube center or the like, as well as at checkout, either as assisted by a checker or utilizing a self-service checkout station. Further, more and more businesses are rolling out a wide variety of self-service kiosks. In such an environment of rapid change, the present invention provides a generic approach which allows interfacing of almost any imaginable end retail application with almost any imaginable POS application.

To such ends, the programmable state machine can receive events and data information from multiple retail applications, produce outputs and emulated outputs for multiple POS applications, as well as receiving event and data information from the POS application and providing outputs and emulated outputs to the retail applications. An exemplary POS manager state machine may implement item control where a message is received to request that the POS application perform an item related paradigm, such as a request to sell a given item, a request to void a given item, or a request to change the price of a given item; similarly, tender control is called to request that a tender operation be performed on the transaction, such as enter or void; transaction control can implement start, to start a new transaction, end, void, suspend, or loyalty to verify whether a given magnetic strip read data is in fact for a loyalty card; cash management can implement functions such as balance, loan and pickup; on tender event can implement functions such as rejected, change due, or accepted; and so forth.

As one example of the flexibility of the present invention, selling an item utilizing most self-service applications requires that a customer scan an item's uniform product code (UPC). If a given POS application does not support the particular scanner used, then the scanned UPC code can be emulated in a compatible manner or supplied as a series of keystrokes.

FIG. 2 illustrates a system 200. In FIG. 2, POS manager wrapper 110 interfaces a different POS service 215, an IBM GSA application, to the FastLane application 130. System 200 also employs a general additional adapter XXX_App manager 220 for other retail applications as further illustrated in FIG. 3. In FIG. 2, it is seen that the same POS manager wrapper 110 is employed, even though the underlying mechanisms for interfacing to the embedded POS have changed. This approach advantageously allows the retail applications to remain unaffected by changes that occur below the POS Manager ←→ XXX_App Manager boundary.

Among its several aspects, the introduction of the standard interface with adaption layers on both sides as addressed herein is architecturally unique in that it allows the POS and retail applications much greater freedom to change because the variation can be accommodated with the adaption layers defined. Further, it allows wholesale changes to the POS layer even to the extent of replacing the POS with a different one as illustrated in FIG. 2 which has different interface mechanisms without disruption of the multiple store applications built against the contract of the standard interface, so long as the new POS is likewise adapted through external means not necessarily POS extensions, to meet the standard interface contract.

This approach allows any POS integration strategy to be exploited by any retail application, such as self-service checkout or the like, without impacting the underlying POS and associated interface as further illustrated in FIG. 3.

In FIG. 3, an overall system 300 employs the POS manager 110 to interface the IBM GSA POS application 215 to illustrative plural retail applications including the FastLane application 130, Money Center application (MCX) 330 which provides ATM and money order services, tire and lube express (TLE), such as might be employed by a tire and lube center, a pharmacy application 340, and an automated retail application 350. As addressed in further detail below, after the reusable POS wrapper has been implemented once, it can be readily adapted to other store sales applications providing a single sales engine for all store applications employing one store wide accounting system and one supporting POS application.

Additionally, the approaches described herein provide the flexibility to accommodate evolving business directions by leveraging the existing sales engine to new self-service touch points. The present invention effectively isolates self-services applications from POS evolution, and future POS changes are readily handled.

The open ended architecture addressed herein is highly extensible allowing a wide variety of extension possibilities employing an integration architecture that creates opportunities, and does not block them.

Fast development is facilitated by replacing most programming with XML configuration files. Solutions have high immunity to POS changes with POS functional interface options. Regression testing of the POS or the entire chain can be readily achieved with the utilization of test points (TP) and a scripted test tool, such as the tool 150 of FIG. 1.

The functional POS wrapper interface can be leveraged by all store applications to provide a single sales engine for all store service applications. Changes to the POS such as new features, menus, or operations do not change the functional interface presented by the reusable POS wrapper so the applications are not impacted by such POS changes. Thus, the entire POS application, within the POS wrapper, can be replaced without impacting the store sales applications. Changes to the POS can be tested at the reusable wrapper interface point to validate that the changes to do not impact the dependant applications before the software components are ever tested together providing huge potential savings.

Figure 4:
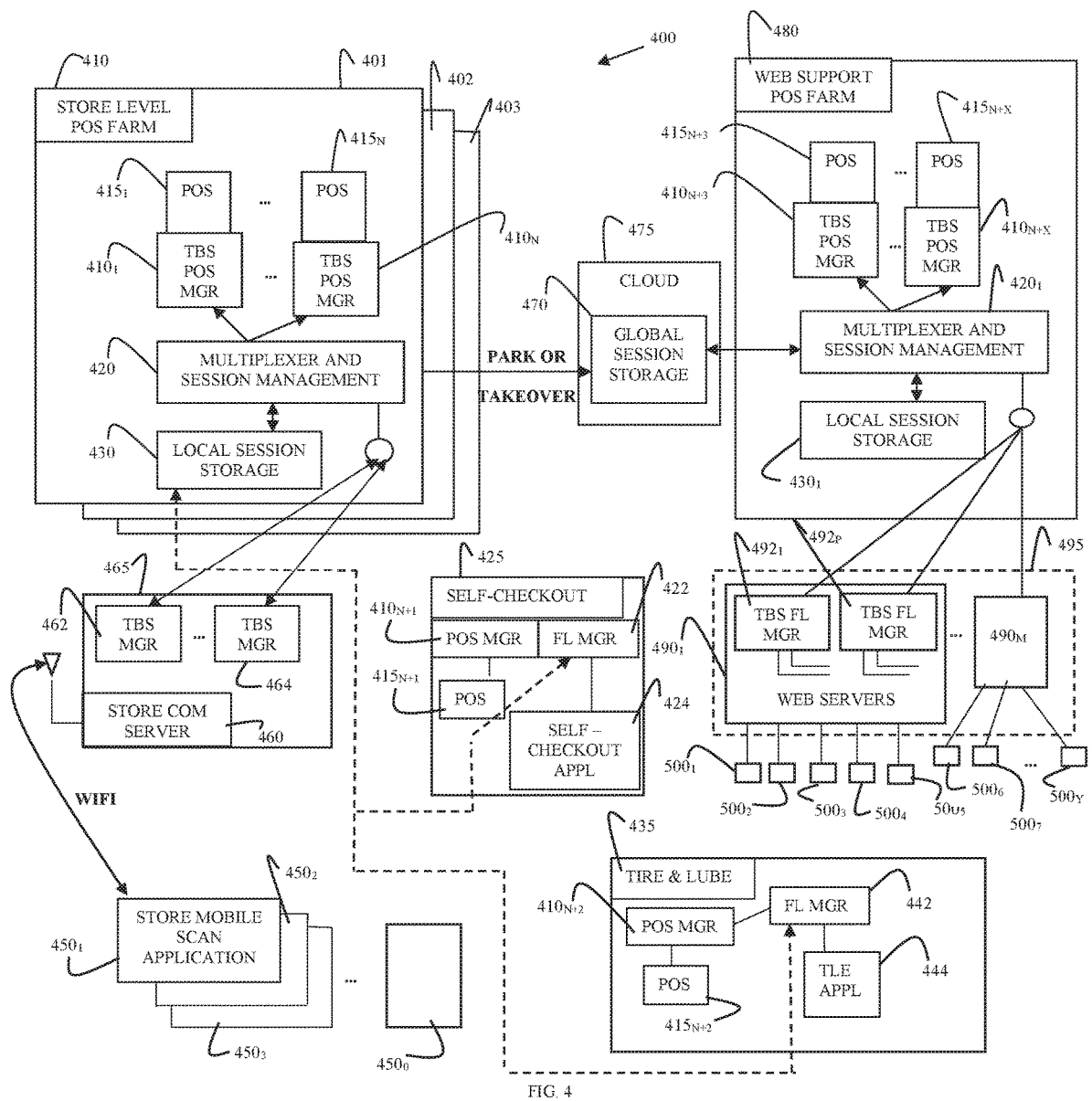
FIG. 4 illustrates a system integrating store level point of sale, store mobile scanning and Internet shopping.

In FIG. 4, a system 400 adapts the present invention to integrating (1) cashier assisted checkout across plural stores; (2) hosting Internet users and integrating web based shopping at store.com sites such as walmart.com, Target.com, and the like; (3) integrating self-checkout POS; (4) integrating non-standard POS for other in store POS systems, such as tire and lube, pharmacy, and the like; (5) providing store mobile scanning support for in aisle price checking or in aisle mobile scanning; and the like.

System 400 comprises a POS farm 410 comprising a plurality of POS managers $410_1, \ldots 410_n$. Each pane 401, 402 and 403 of FIG. 4 represents equipment like that seen in pane 401 for a different store. While three panes are shown for ease of illustration it will be recognized that a large number of stores may be included as desired consistent with the teachings herein.

The POS managers $410_1, \ldots 410_n$ provide a standardized wrapper or interface for POS services $415_1, \ldots 415$ including control of standard POS devices, a POS keyboard, a POS user interface and a POS input and output log, such as those shown in FIG. 1, for example. For further details of such devices see FIG. 1 and the discussion thereof in the cross-referenced U.S. patent application Ser. No. 13/250, 392, filed Sep. 30, 2011 incorporated by reference herein in its entirety.

Additionally, a multiplexer and session management system 420 and local session storage 430 are utilized to multiplex the POS application or instance as further described herein and in the above identified application previously incorporated by reference.

One self-checkout system 425 of a plurality of self-checkout systems employs its own POS managers $410_{n+1}$ and POS application $415_{n+1}$, FastLane manager 422 and self-checkout application 424. One tire and lube checkout system 435 illustrative of plural tire and lube checkout terminals includes POS manager $410_{n+2}$, FastLane manager 442 and tire and lube (TLE) application 444.

The self-checkout system 425 and tire and lube checkout system 435 communicate with the local session storage 430 which provides item list storage support void, restart and resell operation in the context of multiplexing POS instances as further addressed in the above identified application which has been incorporated by reference in its entirety.

To support in aisle scanner using mobile scan devices, such as mobile phones, users download a mobile scan application on their mobile phones to support communication with the appropriate store hardware, bar code scanning, price look up and the like. As seen in FIG. 4, a plurality of store mobile scan applications $450_1, 450_2, 450_3, 450_4 \ldots 450_n$ (collectively 450) communicate using Wi-Fi, for example, with a store communication server 460 in a store mobile scan support system 465. The store communication server 460 hosts an adapter or adapters to communicate with multiplexed POS applications or instances as addressed further. FastLane managers 462 and 464 manage communication between the store mobile scan support system and multiplexer and session management (mux) 420.

In the embodiment of FIG. 4, global session storage 470 is provided in first cloud 475. A session from the POS farm 410 can be parked by multiplexer and session management system 420 by showing the session details in global session storage 470. Similarly, the session can be resumed by retrieving the session details from the global session storage 470. Also, a session stored from another source, such as web support POS faim 480 can be taken over as addressed further below.

As illustrated herein, FIG. 4 shows web support POS farm 480 comprising plural POS managers $410_{n+3} \ldots 410_{n+x}$ and POS applications $415_{n+3} \ldots 415_{n+x}$. It will be recognized that any number of these elements may be deployed if needed by a particular store application context. In FIG. 4, web support POS farm 480 also includes a multiplexer and session management system (mux) 420, and local session storage 430. The mux 420, also communicates with global session storage 470 and can be utilized to park, resume or takeover a session as addressed further below.

In FIG. 4, the web support POS farm 480 provides support for a large number of Internet users communicating with web servers $490_1 \ldots 490_m$ (collectively 490). The web servers 490 each may include plural FastLane managers $492_1 \ldots 492_p$ (collectively 492). The servers 490 comprise an online store system 495 referred to herein as store.com. In the system 400, an Internet user can go to store.com using a user computer such as one of the computers $500_1, 500_2 \ldots 500_q$ (collectively 500) to make an online purchase for delivery by mail, UPS, Fedex, or the like. However, the Internet user can now also conduct a number of other transactions.

As one example, rather than ordering a product by mail, the Internet user can access web support POS farm 480 to check on actual availability of a product at his or her favorite local store 401, 402 or 403 and the actual purchase price including the relevant local and state taxes, as well as, any in store specials local to that particular store. The customer can use a credit card and pay for the item or items desired and the transaction can be parked in the global session storage 470. The customer can be given a token, receipt or indicia to take to the local store, such as a transaction receipt with a bar code that is printed out on a printer connected to the user's computer 500. Taking the receipt to the store, the customer finds the item or items, takes them to checkout, presents identification such as the credit card used or the purchase or a driver's license, the cashier scans the bar code using a bar code scanner at the POS 415, for example, mux 420 retrieves the parked transaction session details, and the transaction is completed.

Similarly, if a customer wants to receive a copy of a videogame the first day it is available in the store, he or she can go online, make an advance purchase reserving a copy. The transaction session is parked in global session storage 470. An email reminder can be sent alerting the customer when the copy of the videogame will be in the store 401. The customer takes the bar code receipt, obtains a reserved copy from customer service, and presents identification and the receipt. The bar code is scanned, the parked transaction details are obtained, and the transaction is completed.

A host of other examples may be recited, but from the above it can be seen that a national store.com 495 can be successfully interfaced with a large plurality of local stores 401, 402, 403 and so on, so that users can access local store pricing. By multiplexing POS instances, large numbers of users can be supported in a highly cost effective manner. Similarly, in aisle scanning by users employing mobile phones can be readily supported. Additionally, divergent systems can be integrated and employed together without making a massive replacement of existing and previously somewhat incompatible store POS systems, such as the tire and lube, pharmacy and garden store systems which were developed with software having different software requirements.

The interoperation of the retail applications through the standard functional POS interface provided by the FlMgr with the store POS wrapped by PosMgr allows (1) any store application to use the standard POS, and (2) that the POS may be extended or replaced without impacting the multitude of store applications dependent on the POS, but isolated from the POS by the PosMgr-FlMgr combination.

Note that while the store level POS faun 410 provides store level services including taxation and local discounts, the POS farm may be located physically at the store or alternately off-premises ("in the cloud") assuming adequate communication between the store and cloud exist. This arrangement allows all such store specific equipment to be centrally located for ease of management and scalability.

While it is illustrated that the POS systems are specific to a store to provide correct discounts and taxation, it is noted that advanced POS systems may be able to change taxation and discounts to represent specific store locations by accepting location information when the transaction is started or resumed.

While the present invention has been disclosed in the context of various aspects of presently preferred embodiments, it will be recognized that the invention may be suitably applied to other environments consistent with the claims which follow.

I claim:

1. An adaptable and extensible transaction interface system comprising:
   a self-service terminal comprising a hardware processor, storage having XML files, and a non-transitory computer-readable storage medium having executable instructions representing a programmable state machine;
   the programmable state machine is executed by the hardware processor from the non-transitory computer-readable storage medium and causes the processor to perform processing comprising:
      transitioning from one state to another based upon occurrence of a sequence of inputs from a self-service application; and
         processing the XML files and establishing mappings and operation rules for the programmable state machine, producing states defined from the XML files, receiving a message as an input from the self-service application and providing emulated outputs as necessary for compatible communication with a transaction application having one or more incompatibilities and preventing direct communication of the message from the self-service application to the transaction application and providing correct operation in response to the message;
         wherein the programmable state machine configured as a wrapper to the transaction application that controls the transaction application's inputs and outputs, and wherein when the transaction application is changed, the wrapper ensures there is no disruption in the compatible communication between the self-service application and the transaction application, and wherein the programmable state machine processes the XML files and provides an interface for compatible interaction between the self-service application and the transaction application.

2. The system of claim 1, wherein the message comprises scan output data for a scanner connected to the self-service terminal and the scan output data is incompatible with the transaction application, wherein the self-service application receives the scan output data from the scanner connected to the self-service terminal and provides the scan output data as the message and the input.

3. The system of claim 2 wherein the programmable state machine emulates the scan output data as a series of keystrokes recognizable by the transaction application.

4. The system of claim 3 wherein the programmable state machine emulates the scan output data in a form which appears to the transaction application like a compatible scanner connected directly thereto.

5. The system of claim 1 further comprising a plurality of reusable self-service applications.

6. The system of claim 1 wherein said mappings comprise keystrokes for a plurality of different keyboards.

7. The system of claim 1 wherein the self-service application is an in store instance of a POS price database and the system is utilized to achieve compatibility with an Internet based store system.

8. The system of claim 1 further comprising:
   a multiplexer and session management system communicating with cloud based global session storage.

9. A method of adapting and extending a transaction interface system utilizing a programmable state machine which transitions from one state to another based upon occurrence of a sequence of inputs from a self-service application comprising:
   establishing mappings and operation rules, by executable instructions that execute on a hardware processor of a self-service terminal from a non-transitory computer-readable storage medium as the programmable state machine;
   processing, by the programmable state machine, XML files, and each XML file defining states produced by the programmable state machine;
   receiving, by the programmable state machine, a message as an input from the self-service application through an interface provided by the self-service application;
   providing, by the programmable state machine, emulated outputs as necessary for compatible communication with a transaction application having one or more incompatibilities and preventing direct communication of the message from the self-service application to the transaction application and providing correct operation in response to the message;
   acting, by the programmable state machine, as a wrapper to the transaction application, on the self-service terminal controlling the transaction application's inputs and outputs and ensuring, by the wrapper that when the transaction application is changed there is no disruption in the compatible communication between the self-service application and the transaction application;
   processing the wrapper as a compatible interface for communication between the self-service application and the transaction application.

10. The method of claim 9 wherein the self-service application is a self-service checkout application.

11. The method of claim 10 further comprising:
scanning, by the self-service terminal, a bar code with a scanner producing scan output data which is incompatible with the transaction application, and wherein the self-service application obtains the scan output data from the scanner and provides the scan output data as message and the input.

12. The method of claim 11 further comprising:
emulating, by the programmable state machine, the scan output data as a series of keystrokes recognizable by the transaction application.

13. The method of claim 11 further comprising:
emulating, by the programmable state machine, the scan output data in a form which appears to the Transaction application like a compatible scanner connected directly thereto.

14. The method of claim 9 further comprising:
reusing, by the self-service terminal, a plurality of transaction applications.

15. The method of claim 9 wherein said mappings comprise keystrokes for a plurality of different keyboards.

16. The method of claim 9 wherein the self-service application is an in store instance of a POS price database and further comprising:
utilizing the programmable state machine and XML tiles to achieve compatibility with an Internet based store system.

17. The method of claim 9 further comprising:
communicating, by the self-service terminal, with cloud based global session storage employing a multiplexer and session management system.

\* \* \* \* \*